(12) United States Patent
Stark

(10) Patent No.: US 9,335,149 B2
(45) Date of Patent: May 10, 2016

(54) DISPLACEMENT SENSOR FOR CONTACTLESSLY MEASURING A POSITION BY MEANS OF A PLURALITY OF MAGNETIC FIELD SENSORS ARRANGED IN SERIES

(71) Applicant: Tyco Electronics AMP GmbH, Bensheim (DE)

(72) Inventor: Sebastian Stark, Weinheim (DE)

(73) Assignee: TE Connectivity Germany GmbH, Bensheim (DE)

( * ) Notice: Subject to any disclaimer, the term of this patent is extended or adjusted under 35 U.S.C. 154(b) by 33 days.

(21) Appl. No.: 14/394,081

(22) PCT Filed: Apr. 5, 2013

(86) PCT No.: PCT/EP2013/057252
§ 371 (c)(1),
(2) Date: Oct. 10, 2014

(87) PCT Pub. No.: WO2013/153005
PCT Pub. Date: Oct. 17, 2013

(65) Prior Publication Data
US 2015/0084619 A1    Mar. 26, 2015

(30) Foreign Application Priority Data

Apr. 11, 2012   (DE) .................... 10 2012 205 902

(51) Int. Cl.
| | |
|---|---|
| *G01B 7/30* | (2006.01) |
| *G01B 7/14* | (2006.01) |
| *G01B 7/004* | (2006.01) |
| *G01D 5/14* | (2006.01) |

(52) U.S. Cl.
CPC ................ *G01B 7/004* (2013.01); *G01D 5/145* (2013.01)

(58) Field of Classification Search
CPC ................................ G01B 7/004; G01D 5/145
USPC ............................. 324/207.2, 207.21, 207.15
See application file for complete search history.

(56) References Cited

U.S. PATENT DOCUMENTS

| | | | |
|---|---|---|---|
| 2005/0189938 A1 | 9/2005 | Schley et al. | |
| 2006/0103375 A1* | 5/2006 | Dmytriw ................ | G01D 5/145 324/207.21 |

FOREIGN PATENT DOCUMENTS

| | | |
|---|---|---|
| WO | WO 99/53266 | 10/1999 |
| WO | WO 01/50091 A1 | 7/2001 |
| WO | WO 02/095333 A1 | 11/2002 |

OTHER PUBLICATIONS

International Search Report and Written Opinion issued by the European Patent Office dated Aug. 6, 2013, for International Application No. PCT/EP2013/057252; 10 pages.

*Primary Examiner* — Jermele M Hollington
*Assistant Examiner* — Farhana Hoque
(74) *Attorney, Agent, or Firm* — Faegre Baker Daniels LLP

(57) ABSTRACT

The present invention relates to a displacement sensor for contactlessly measuring a position of a magnet relative to a reference point. The displacement sensor comprises the magnet which can be displaced along a movement axis, a plurality of magnetic field sensors which are arranged in series and which are arranged parallel with the movement axis of the magnet and a calculation unit for forming a position signal which indicates the position of the magnet relative to the reference point. The plurality of magnetic field sensors which are arranged in series are arranged in such a manner that the displacement measurement ranges of adjacent magnetic field sensors overlap in an overlap range. The calculation unit is constructed in such a manner that, if the position of the magnet is contained in an overlap range, it forms the position signal on the basis of output signals which are output by the magnetic field sensors whose displacement measurement ranges overlap in the overlap range; and, if the position of the magnet is not contained in an overlap range, it forms the position signal on the basis of the output signal which is output by the magnetic field sensor, in the displacement measurement range of which the magnet is located. The overlap range between two displacement measurement ranges of adjacent magnetic field sensors is selected in such a manner that the total error of the position signal formed by the calculation unit in that overlap range is smaller than a maximum tolerable error.

18 Claims, 4 Drawing Sheets

DISPLACEMENT SENSOR FOR CONTACTLESSLY MEASURING A POSITION BY MEANS OF A PLURALITY OF MAGNETIC FIELD SENSORS ARRANGED IN SERIES

The present invention relates to a displacement sensor for contactlessly measuring a position of a magnet, in particular a displacement sensor which has a displacement range which is several times greater than an individual magnetic field sensor on the basis of a plurality of magnetic field sensors arranged in series.

In the displacement sensor according to the invention, the precision of the position signal which is output by the displacement sensor and which indicates the position of the magnet relative to a reference point is intended to be below a maximum tolerable error level over the entire displacement range.

A typical example of a magnetic field sensor is the Hall sensor. By way of representation of a magnetic field sensor, the present invention is described with reference to a Hall sensor but is not limited thereto.

Hall sensors are used in many cases for controlling machine tools, in automation technology, robotics and in the automotive sector. In comparison with displacement sensors which operate in accordance with an optical method, Hall sensors are less sensitive to dirt and damage because they can be enclosed hermetically with a non-magnetic casing.

In displacement sensors which use a Hall sensor for detecting the movement of a movable member, a magnet is fitted to the movable member and the magnetic field produced by the magnet is detected during the movement of the member by the Hall sensor. Owing to the movement of the magnet, the Hall sensor detects a magnetic field which changes over time and outputs an output signal dependent on the position of the magnet. The precision of the output signal decreases with decreasing flux density of the magnetic field detected by the Hall sensor. The position determination of the magnet thereby becomes less precise with increasing spacing of the magnet from the Hall sensor.

The precision of the position determination, in particular at relatively large spacings between the magnet and the Hall sensor, is increased by using sensors having 3D Hall technology (referred to below as 3D Hall sensors). In this type of Hall sensors, two mutually perpendicular magnetic field components are measured at a location, the relationship is formed between the measured magnetic field components, and the position of the magnet relative to this location is indicated with reference to the relationship.

FIG. 1 shows a 3D Hall sensor 100. It has a zero point 0 which is above the sensor centre. If a magnet moves along or parallel with a movement axis 101 which extends through the zero point 0 of the 3D Hall sensor, the sensor outputs an output signal 102 which indicates the position of the magnet relative to the zero point of the sensor. The precision with which the output signal indicates the position of the magnet relative to the zero point decreases with increasing spacing of the magnet from the zero point. That limits the displacement measurement range of a 3D Hall sensor. In known 3D Hall sensors, it is a maximum of 40 mm (±20 mm about the zero point).

FIG. 2 shows the output signal 102 of the 3D Hall sensor shown in FIG. 1 in accordance with the position of the magnet relative to the zero point. In a range around the zero point, there exists a linear relationship between the output signal 102 of the sensor and the position of the magnet relative to the zero point. At the two ends 103 and 104 of the displacement measurement range, the variation of the measurement signals and therefore of the measurement errors becomes greater; the linear relationship between the output signal 102 of the sensor and the position of the magnet is lost because the precision with which the output signal 102 indicates the position of the magnet has become too low. From a given spacing of the magnet from the zero point, the precision with which the output signal 102 indicates the position of the magnet is so low that a relationship no longer exists between the output signal 102 of the 3D Hall sensor and the position of the magnet relative to the zero point.

The publication U.S. Pat. No. 6,097,183 discloses a displacement sensor having sensors arranged in series and a magnet which can move past the sensors along a movement axis. The sensors are either magnetoresistive sensors or Hall sensors which are sensitive in one direction. The position signal which indicates the position of the magnet is established in this instance on the basis of two output signals which are output by two adjacent sensors which are located near the magnet. A linear relationship does not exist between the position signal established in that manner and the position of the magnet. The position signal in accordance with the position of the magnet instead has a wave-like path which may be attributed to non-linearities in the sensors. In order to compensate for these, a correction factor dependent on the position of the magnet is added to the position signal. A displacement measurement range of 40 mm, as commercially conventional 3D Hall sensors currently have, is too small for many applications in which the movement of a movable member is intended to be detected.

Therefore, an object of the present invention is to provide a displacement sensor which makes use of the principle of the Hall effect but which has a substantially greater displacement measurement range than a commercially conventional 3D Hall sensor, simultaneously complying with a maximum tolerable total error of the position signal output by the displacement sensor.

This object is achieved by the subject-matter of patent claim 1. The dependent patent claims relate to other advantageous developments of the displacement sensor according to the invention.

The present invention is based on the notion that a plurality of Hall sensors are arranged in series and parallel with the movement axis of a magnet, displacement measurement ranges of adjacent Hall sensors overlap at the ends thereof, the position signal is formed in an overlap range on the basis of output signals which are output by the Hall sensors whose displacement measurement ranges overlap in the overlap range and the position signal is formed in a non-overlapping portion of a displacement measurement range on the basis of the output signal which is output by the Hall sensor, in the displacement measurement range of which the magnet is located. In particular, the overlap of the displacement measurement ranges of adjacent Hall sensors is selected in such a manner that the total error of the position signal formed in the overlap range is smaller than a maximum tolerable error.

A linear relationship between the position signal output by the displacement sensor and the position of the magnet relative to the reference point can be achieved particularly readily if a linear relationship exists between the output signal of the Hall sensor and the position of the magnet relative to the zero point of the Hall sensor.

The extension of the displacement measurement range of the displacement sensor is optimum when a linear relationship does not exist in the overlap range between the output signal of the Hall sensor and the position of the magnet relative to the zero point of the Hall sensor.

A constant, linear path of the position signal output by the displacement sensor can readily be achieved by an offset correction of the output signals output by the Hall sensors.

The determination of the offset of an output signal can readily be implemented by means of a learning routine if the difference between a first output signal value and a second output signal value is formed at the transition of the magnet from the non-overlapping portion of a displacement measurement range to the overlap range of the displacement measurement range further away from the reference point, with the first output signal value and the second output signal value being output by the Hall sensors, the displacement measurement ranges of which overlap in the overlap range during the transition of the magnet from the non-overlapping portion of the displacement measurement range to the overlap range of the displacement measurement range further away from the reference point.

If the position signal is formed in an overlap range on the basis of the position information which is contained in the two output signals output in this overlap range, the total error of the position signal can also be kept within the scope of the maximum tolerable error if the error of one or both output signals exceeds the maximum tolerable error in partial pieces of the overlap range.

When the displacement sensor according to the invention is produced, one or more printed circuit board(s) is/are provided with a plurality of Hall sensors. A desired position on the printed circuit board is predetermined for each Hall sensor and attempts are made to mount the Hall sensor in accordance with the predetermined desired position on the printed circuit board. If there is no deviation between the desired position and the actual position of the Hall sensor on the printed circuit board after the Hall sensor has been mounted on the printed circuit board, the offset of an output signal can readily be determined on the basis of the desired position of the Hall sensors known from plans or printed circuit board layouts.

If the printed circuit board is provided with a Hall sensor, however, a deviation between the desired position and the actual position of the Hall sensor on the printed circuit board may occur. This deviation leads to a change in the overlap ranges of the displacement measurement range thereof. If the offset of an output signal is determined on the basis of the position of the Hall sensors on the printed circuit board, this change must be taken into consideration, which is particularly complex if the actual position of a plurality of Hall sensors deviates from the desired position thereof.

The establishment of the offset of an output signal can be substantially simplified for arrangements in which the actual position or orientation of a Hall sensor on the printed circuit board differs from the desired position or orientation if a learning routine is used therefor.

The learning routine may be implemented in such a manner that it establishes the offset of an output signal on the basis of the sum of differences between two output signal values which are formed in all transitions which are located between the displacement measurement range containing the reference point and the displacement measurement range for which the offset is intended to be established.

Alternatively, the offset of an output signal can be formed on the basis of the difference between a position signal value and an output signal value which are formed during the transition to the corresponding overlap range by the calculation unit or a Hall sensor.

The precision with which the output signal indicates the position of the magnet relative to the zero point is dependent on the speed of the magnet. The greater the speed of the magnet at the time when the magnetic field is detected by the Hall sensor, the less precisely the output signal output by the Hall sensor indicates the position of the magnet. The speed of the magnet also acts on the precision with which the offset is established. This is caused by occurrences of unsharpness owing to time-discrete scanning.

This influence can be substantially reduced if the differences, on the basis of which an offset is established, are formed from averaged output signal values or the offset is established from the difference between a mean position signal value and a mean output signal value.

The mean value formation can be implemented more readily in a manner saving resources if the mean value is a sliding mean value.

A further improvement to the precision of an offset can be achieved by means of a weighted mean value, with the weighting of the signal values depending on the speed of the magnet.

It is particularly possible to improve the precision of the offset established by subtraction if the weighting decreases with increasing speed of the magnet and signal values which were generated at a speed exceeding a specific maximum value are not used to form the first or second mean value.

The error of the position signal in the overlap range can be kept within the scope of the maximum tolerable error if, between the output signals which are output for that overlap range, the output signal having the greatest precision is selected and is used to form the position signal.

The error of the position signal in the overlap range can also be kept within the scope of the maximum tolerable error if a weighted mean value is formed between the position signals output in the overlap range for forming the position signal, and if the weighting of the signals is dependent on the position of the magnet in the overlap range. The formation of a weighted mean value further results in a gentle transition between the position signals inside and outside the overlap range.

A gentle transition can also be achieved if the position signal in the overlap range has the path of an S-line, a parabola or an exponential function.

Very simple implementation can be achieved by switching from one sensor signal to the sensor signal of the other sensor in an abrupt manner at a defined location in the overlap range.

The advantages of the present invention may particularly be achieved by using Hall sensors with 3D Hall technology.

For a better understanding of the present invention, it is explained in greater detail with reference to the appended Figures. Identical components are referred to using the same reference numerals and the same component designations.

The invention is intended to be described in greater detail below with reference to the Figures.

Figure 3:
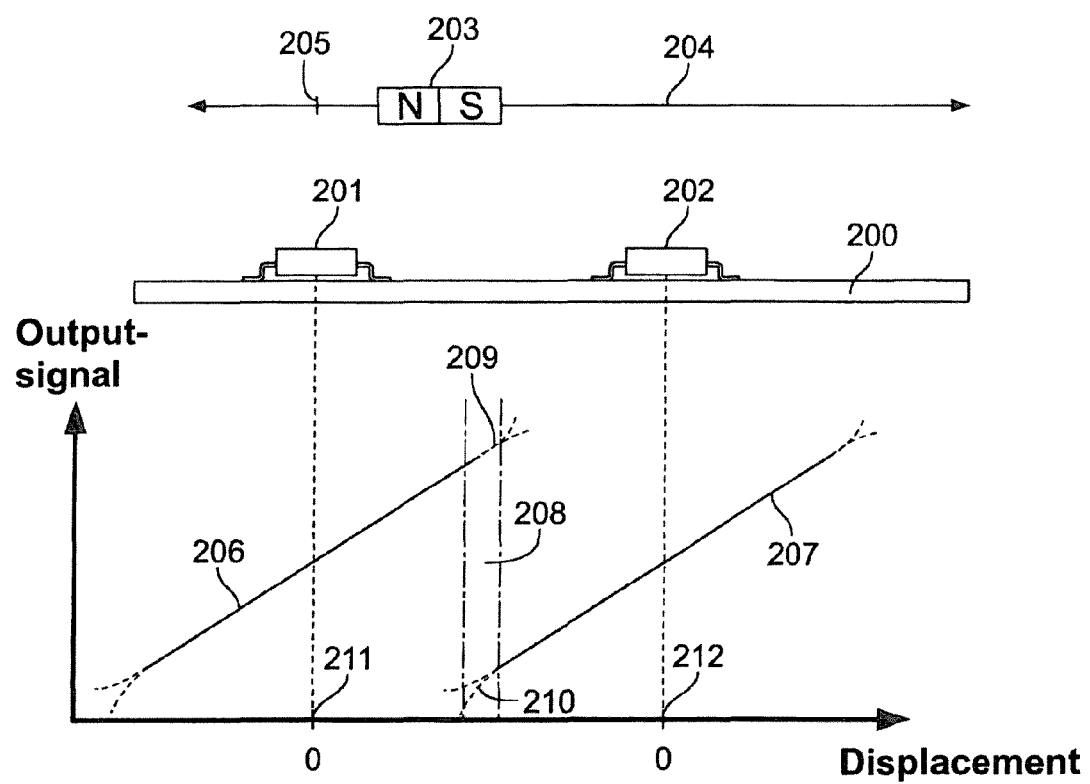
FIG. 3 shows a displacement sensor arrangement according to the invention.

FIG. 3 shows a displacement sensor arrangement according to the present invention. The two 3D Hall sensors 201 and 202 arranged in series are mounted in a fixed position on a printed circuit board 200 and the magnet 203 which is preferably a permanent magnet can be displaced along the movement axis 204 in relation to the two Hall sensors. The north/south axis of the magnet 203 is orientated parallel with the movement axis 204. However, this orientation is not absolutely necessary. In principle, it is also possible to carry out the present invention if the north/south axis of the magnet has a different orientation, for example, transverse relative to the movement axis.

The magnet can be displaced from the reference point 205 shown in FIG. 3. The 3D Hall sensor, near which the magnet is located, detects at least two orthogonal magnetic field components and produces an output signal which extends linearly around the zero point of the 3D Hall sensor in a limited range. The output signal output by the 3D Hall sensor may be, for example, an analogue signal such as a voltage signal, a current signal or a pulse-width-modulated signal, or can be output as a digital signal via a bus or another digital interface.

Figure 1:
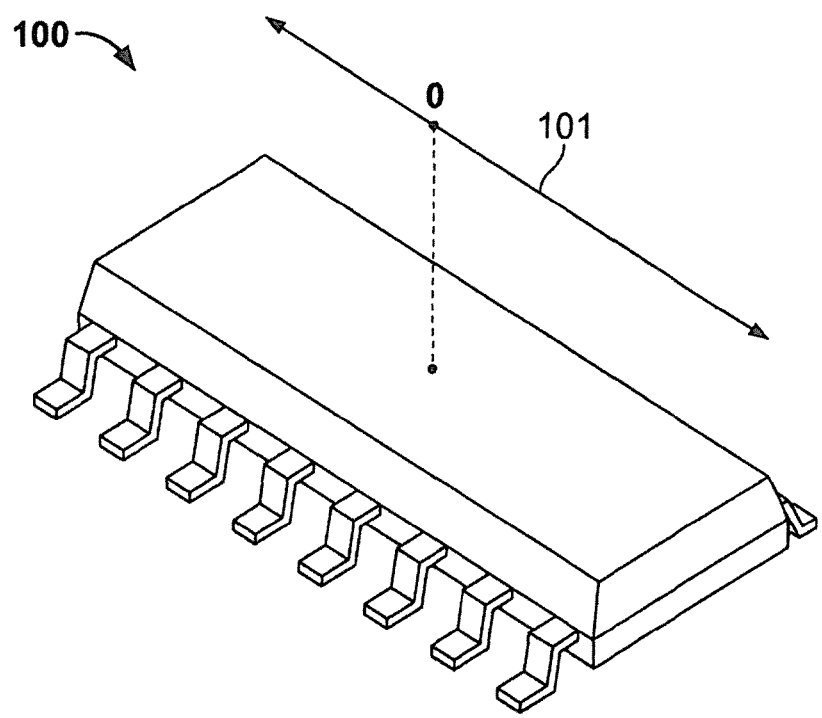
FIG. 1 shows a 3D Hall sensor which is used in a displacement sensor according to the invention.
Figure 2:
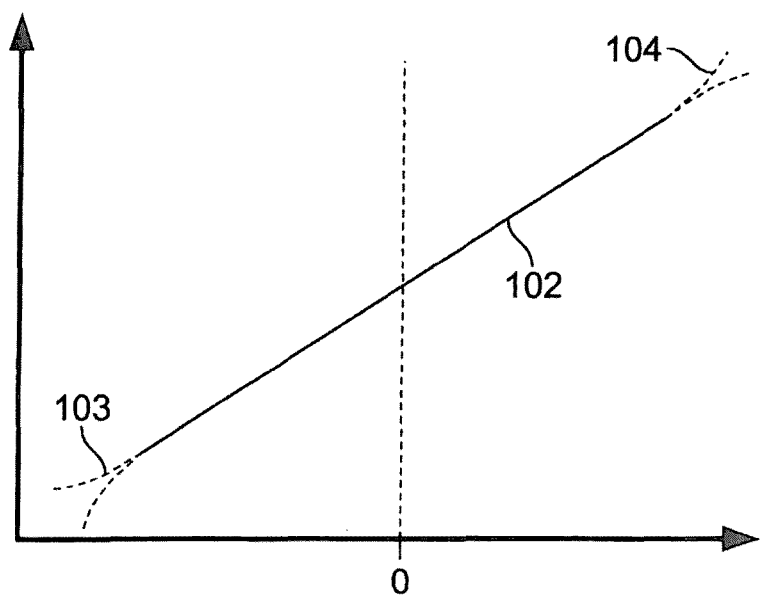
FIG. 2 shows the output signal of a 3D Hall sensor in accordance with the position of a magnet in relation to the zero point of the 3D Hall sensor.

FIG. 2 shows the output signal 102 of a 3D Hall sensor in accordance with the position of the magnet relative to the zero point of the 3D Hall sensor. The measurement precision of the output signal decreases the further the magnet is away from the zero point. The displacement measurement range of the 3D Hall sensor is thereby limited. At the end of the path measurement range, the measurement precision of the output signal becomes lower or the measurement error becomes greater. If the magnet is moved beyond a specific location, the output signal of the 3D Hall sensor can no longer be used in a meaningful manner.

The displacement sensor according to the invention has a displacement measurement range which is practically several times greater than the displacement measurement range of an individual 3D Hall sensor. According to the invention, that is brought about by a plurality of 3D Hall sensors being arranged parallel with the movement axis of the magnet. The 3D Hall sensors are arranged in such a manner that the displacement measurement ranges of adjacent 3D Hall sensors overlap, as illustrated in the lower portion of FIG. 3.

FIG. 3 illustrates the output signals 206 and 207 of the Hall sensors 201 and 202 in accordance with the position of the magnet. The output signals 206 and 207, and therefore also the displacement measurement ranges belonging to the 3D Hall sensors 201 and 202, overlap in the overlap range 208. The end ranges 209 and 210 which overlap each other are selected so that the output signal at least in a portion of each end range has a measurement error which is below a maximum tolerable error. This overlap ensures that the two adjacent 3D Hall sensors in the overlap range output a meaningfully usable output signal and consequently the displacement information in the overlap range can be transmitted from the 3D Hall sensor 201 to the 3D Hall sensor 202.

So that the two output signals 206 and 207 clearly determine the position of the magnet relative to the reference point 205, the output signal of the 3D Hall sensor 202 must be corrected with an offset in such a manner that there is no jump between the two output signals 206 and 207 in the overlap range. The output signals 206 and 207 are preferably one in continuation of the other. In the overlap range, it is also possible to indicate the position of the magnet within the scope of a tolerable error by using the output signal 206 and the offset-corrected output signal 207 if the measurement precision of the output signals 206 and 207 exceed the maximum tolerable error in portions of the overlap range. For this purpose, however, as shown in FIGS. 4 and 5, the end ranges of the output signals 206 and 207 which overlap each other in the overlap range must be selected accordingly.

Figure 4:
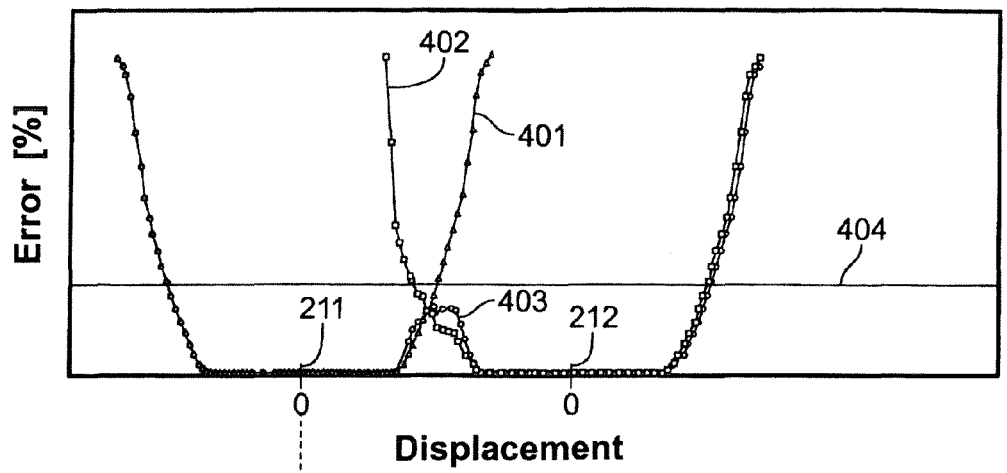
FIG. 4 shows the relative error for two output signals and the position signal in accordance with the position of the magnet in a displacement sensor arrangement according to the invention.

FIG. 4 shows the paths of the relative error for the output signals 206 and 207 and the path of the total error of the position signal in a displacement sensor arrangement according to the invention. The reference numerals 401, 402 and 403 relate to the relative error of the output signal 206, the relative error of the output signal 207 and the total error of the position signal, respectively. The position signal indicates the position of the magnet relative to the reference point 205 and is formed on the basis of the output signals 206 and 207, as described below. The relative error 401 remains small within a limited range around the zero point 211 and rapidly increases in the end ranges of the displacement measurement range. In the overlap range, the relative error 401 is initially below the maximum tolerable error 404 but exceeds it from a given spacing from the zero point 211. This applies accordingly to the relative error 403.

The total error 403 substantially adopts the path of the relative errors 401 and 402 outside the overlap range. In the overlap range, the total error 403 is always below the maximum tolerable error 404.

Figure 5:
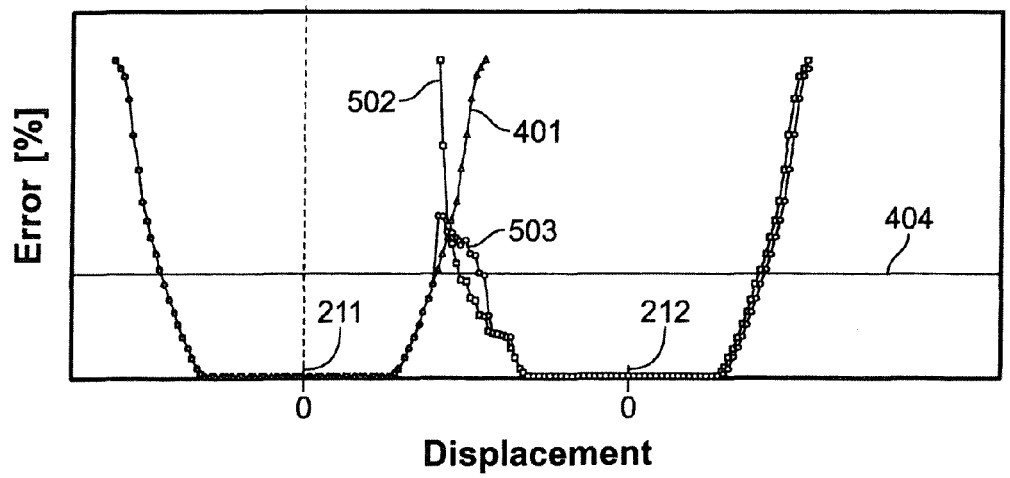
FIG. 5 shows the relative error for two output signals and the position signal in accordance with the position of the magnet in a displacement sensor arrangement which is not in accordance with the invention because the admissible total error is exceeded.

FIG. 5 shows the paths of the relative error for the output signals 206 and 207 and the path of the total error of the position signal in a displacement sensor arrangement which is not in accordance with the invention. The reference numerals 401, 502 and 503 relate to the relative error of the output signal 206, the relative error of the output signal 207 and the total error of the position signal. The paths of the relative error 401 in FIGS. 4 and 5 scarcely differ. The path of the relative error 502 differs from the path of the relative error 402 in FIG. 4 in that it is displaced in the displacement direction. As a result, the total error 503 in the overlap range has a different path to that of the total error 403 in FIG. 4. Furthermore, the total error 503 exceeds the maximum tolerable error in the overlap range.

The overlapping end ranges of the output signals 201 and 202 in FIG. 5 do not ensure that the total error 503 remains below the maximum tolerable error at all locations of the overlap range. FIGS. 4 and 5 show that the path of the total error of the position signal in the overlap range, is dependent on the selection of the overlapping end ranges. In particular, the selection of the overlapping end ranges determines whether the total error of the position signal in the overlap range is or is not below the maximum tolerable error. If the overlapping end ranges are too far from the respective zero points, the total error of the position signal in the overlap range cannot be kept below the maximum tolerable error. The path of the total error of the position signal in the overlap range is also dependent on the manner in which the position signal is formed in the overlap range on the basis of the output signals 201 and 202.

According to the present invention, the end ranges of the output signals 201 and 202 which overlap in the overlap range are selected in such a manner that the total error of the position signal formed on the basis of the output signals 201 and 202 in the overlap range is smaller than the maximum tolerable error.

Since the total error of the position signal in the overlap range is also dependent on the manner in which the position signal in the overlap range is formed, various overlapping end ranges of the output signals 206 and 207 have to be selected in accordance with how the position signal is formed from the output signals 206 and 207 in order to ensure that the total error of the position signal in the overlap range is smaller than the maximum tolerable error.

There now follows a description of how the displacement sensor according to the present invention forms the position signal. The position signal indicates the position of the magnet relative to the reference point 205; a clear association exists between a position signal value and a position of the magnet relative to the reference point 205. A linear relationship over the entire displacement measurement range of the displacement sensor preferably exists between the position signal and the position of a magnet relative to the reference point.

The displacement measurement range in which the reference point is located, also referred to below as the reference range, is the displacement measurement range in which the magnet will be located at the start of the first initial operation. The displacement measurement range which acts as the reference range is dependent on the application in which the displacement sensor is used. In the displacement sensor arrangement shown in FIG. 3, the displacement measurement range of the 3D Hall sensor 201 acts as the reference range. However, the displacement measurement range of the 3D Hall sensor 202 or the overlap range 208 may also act as the reference range. If the reference range is in the overlap range, an unclean or non-constant path of the position signal may occur during the first transition into the non-overlap ranges. However, this non-constancy in the path of the position signal may be overcome by means of a learning routine, as described below. Only the case in which the reference point 205 is in the displacement measurement range of the 3D Hall sensor 201 will be described below. This case is illustrated in FIG. 3. This applies accordingly to the case in which the reference point is located in the displacement measurement range of the 3D Hall sensor 202.

For the calculation of the position signal, the displacement sensor according to the invention has a calculation unit which differentiates between three states. The first state relates to the case in which the magnet is located in the non-overlapping portion of the reference range. In relation to the displacement sensor arrangement illustrated in FIG. 3, that is the case if the magnet is located in the displacement measurement range of the 3D Hall sensor 201. The second state relates to the case in which the magnet is located in an overlap range and the third state relates to the case in which the magnet is located in the non-overlapping portion of a displacement measurement range which is not a reference range. In relation to the displacement sensor arrangement illustrated in FIG. 3, that is the case if the magnet is located in the displacement measurement range of the 3D Hall sensor 202.

The calculation unit calculates the position signal in accordance with the state in which the displacement sensor currently is.

In the first state, the position signal is established on the basis of the output signal which is output by the 3D Hall sensor of the reference range. The calculated position signal is preferably identical to the output signal which is output by the 3D Hall sensor of the reference range. The following applies in relation to the displacement sensor arrangement illustrated in FIG. 3:

$$\text{Pos}_{Signal} = \text{Pos}_{IC1},$$

where $\text{Pos}_{Signal}$ is the position signal, and $\text{Pos}_{IC1}$ is the output signal output by the 3D Hall sensor 201.

In the second state, the calculation unit establishes the position signal on the basis of the output signals which are output by the two 3D Hall sensors whose displacement measurement ranges overlap in the overlap range. However, the output signal which is output by a 3D Hall sensor and whose displacement measurement range is not the reference range is corrected with an offset in order to compensate for the difference between the two output signals output in the overlap range. If none of the displacement measurement ranges which overlap in the overlap range is a reference range, both output signals are corrected with an individual offset. In relation to the displacement sensor arrangement illustrated in FIG. 3, the position signal is established on the basis of the output signal of the 3D Hall sensor 201 and the output signal of the 3D Hall sensor 202. The output signal of the 3D Hall sensor 202 is corrected with an offset in order to adjust it in the overlap range with respect to the output signal of the 3D Hall sensor 201. The methods according to which the offset can be established will be described below.

In the third state, the calculation unit establishes the position signal on the basis of the output signal which is output by a 3D Hall sensor whose displacement measurement range is not a reference range. However, this output signal is further corrected with an offset in order to adjust it in the overlap range with respect to the output signal of an adjacent displacement measurement range. The following applies in relation to the displacement sensor arrangement shown in FIG. 3:

$$\text{Pos}_{Signal} = \text{Pos}_{IC2} + x_{Offset},$$

where $\text{Pos}_{Signal}$ is the position signal, $\text{Pos}_{IC2}$ is the output signal 207 output by the 3D Hall sensor 202, and $x_{Offset}$ is the offset with which the output signal 207 is corrected in order to adjust the two output signals output in the overlap range of the 3D Hall sensors 201 and 202 with respect to each other.

Figure 6:
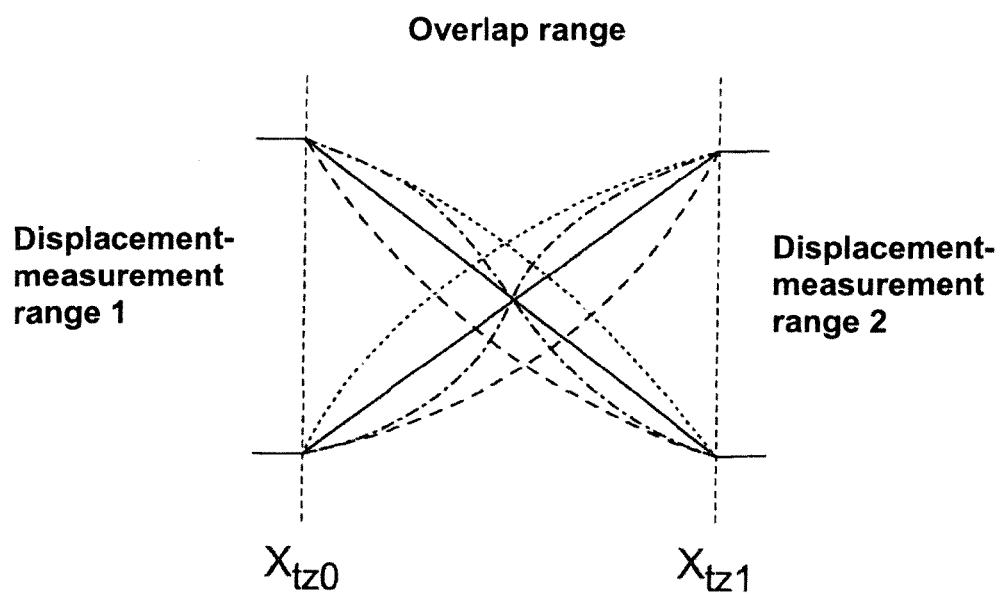
FIG. 6 shows the transition from the non-overlapping portion of a displacement measurement range to the overlap range of two displacement measurement ranges and possible paths of the position signal in the overlap range.

FIG. 6 shows the overlap range between a first displacement measurement range and a second displacement measurement range and a plurality of paths of the position signal within the overlap range. The transition from the non-overlapping portion of the first displacement measurement range to the overlap range takes place at the position $x_{tz0}$ and the transition from the overlap range to the non-overlapping portion of the second displacement measurement range takes place at the position $x_{tz1}$. FIG. 6 shows both cases in which the position signal increases or decreases in the overlap range. The change (transition) from the position signal output in the first displacement measurement range to the position signal output in the second displacement measurement range takes place in the overlap range. The change may occur in an abrupt or gentle (continuous) manner both in the case of an increasing and in the case of a decreasing position signal in the overlap range.

According to the invention, an abrupt change is brought about in that the position signal having the greatest measurement precision is selected from those two position signals. If the measurement precision of the position signal values selected in that manner is within the scope of the maximum tolerable error, it is also possible to form a position signal which is within the scope of the maximum tolerable error when the measurement precision of the two position signals/output signals output in the overlap range in portions of the overlap range is not within the scope of the maximum tolerable error. In relation to the displacement sensor arrangement shown in FIG. 3, the change from the output signal 206 to the output signal 207 which is corrected with an offset occurs in that, from the signal values of those two signals, the signal values whose measurement precision is greatest are selected.

According to the invention, it is possible to achieve a gentle/constant transition (change) in that the position signal calculated for the overlap range is formed on the basis of a weighted mean value between the output signals output in the overlap range. Output signals which do not relate to a reference range have to be corrected beforehand with a corresponding offset. When the mean value is formed, the weighting of an output signal is dependent on the position in the overlap range for which the position signal is calculated. The weighting of the output signal output in the first displacement measurement range preferably decreases with increasing spacing from the position $x_{tz0}$. The weighting of the output signal output in the second displacement measurement range also decreases with increasing spacing from $x_{tz1}$.

In relation to the displacement sensor arrangement illustrated in FIG. 3, it is possible to achieve a gentle transition (change) from the output signal 206 to the output signal 207 corrected with an offset by means of the following mean value formation:

$$Pos_{Signal} = Pos_{IC1} \cdot \frac{Pos_{IC1} - x_{tz1}}{x_{tz0} - x_{tz1}} + (Pos_{IC2} + x_{offset}) \cdot \frac{Pos_{IC2} + x_{offset} - x_{tz0}}{x_{tz1} - x_{tz0}};$$

where:

$Pos_{Signal}$ is the position signal calculated for the position pos in the overlap range;

$Pos_{IC1}$ is the output signal value output by the Hall sensor 201 at the position pos of the overlap range;

$Pos_{IC2}$ is the output signal value output by the Hall sensor 202 at the position pos of the overlap range; and $x_{offset}$ is the offset with which the second output signal 207 is corrected in order to adjust it in the overlap range with respect to the output signal 206.

The signal values of the signals $Pos_{Signal}$, $Pos_{IC1}$, $Pos_{IC2}$, $x_{offset}$, $x_{tz0}$ and $x_{tz1}$ must be set out in the same physical units. They are preferably set out in displacement units (mm, cm).

The formation of the position signal on the basis of a weighted mean value between the output signal 206 and the offset-corrected output signal 207 not only results in a gentle path of the position signal in the overlap range but also allows the formation of a position signal whose measurement precision is within the scope of the maximum tolerable error even when, as shown in FIG. 4, the measurement precisions of the output signals 206 and 207 substantially exceed the maximum tolerable error in portions of the overlap range.

Those advantages can also be achieved if, as shown in FIG. 6, the position signal in the overlap range has the path of an S-line, a parabola or an exponential function. In principle, the line may be of any shape but has a monotonous gradient. The line shape may be implemented, for example, by means of a look-up table.

The next aspect to be described is how the offset of an output signal is established.

The offset can be established in the displacement sensor according to the invention on the basis of the geometric arrangement of the Hall sensors mounted on the printed circuit board and the characteristic line of the Hall sensors (which indicates the output signal in accordance with the position of the magnet relative to the zero point). The spacing between two adjacent Hall sensors is established and the limits $x_{tz0}$ and $x_{tz1}$ of the overlap range are fixed from the printed circuit board layout of the displacement sensor and, on the basis of the characteristic lines, the difference between the output signals of adjacent Hall sensors is established at the location $x_{tz0}$ or $x_{tz1}$.

Once the limits $x_{tz0}$ and $x_{tz1}$ are fixed for an application, they are stored in a storage unit and do not change any more over time. The limits $x_{tz0}$ and $x_{tz1}$ can, however, be selected so as to be different from application to application as required.

When the printed circuit board layout or system layout is produced, it must be ensured that the spacing between two Hall sensors is not excessively great or that the output signals of the Hall sensors in the overlap range still supply a meaningfully usable measurement result, at least in portions of the overlap range, that is to say that the output signal correlates with the position of the magnet relative to the zero point. When the limits $x_{tz0}$ and $x_{tz1}$ are fixed, it must also be ensured that the measurement precision of the output signals in the overlap range is large enough to allow the formation of a position signal whose total error is within the scope of the maximum tolerable error. The offset can then be established with extremely high precision if the characteristic lines which overlap at a limit of the overlap range, $x_{tz0}$ or $x_{tz1}$, are still linear.

When the offset is formed, a distinction has to be made as to whether one of the overlapping displacement measurement ranges is or is not a reference range.

For example, if the first of the displacement measurement ranges which overlap in FIG. 6 is a reference range, the offset for the output signal of the second displacement measurement range is equal to the difference between the output signals output at the transition $x_{tz0}$. Alternatively, the difference which was formed at $x_{tz1}$ can be used therefor.

If none of the displacement measurement ranges overlapping in FIG. 6 is a reference range, the offset is equal to the sum of the differences which were formed at all the transitions $x_{tz0}$ which are located between the reference range and the displacement measurement range, for the output signal of which the offset is intended to be established. Alternatively, the differences which were formed at $x_{tz1}$ can be used therefor.

An offset which is established according to the above method is stored in a storage unit of the displacement sensor and does not change any more over time.

During the production of the displacement sensor according to the invention, one or more printed circuit boards is/are provided with a plurality of Hall sensors. For each Hall sensor, a desired position on the printed circuit board is predetermined and attempts are made to mount the Hall sensor according to the predetermined desired position on the printed circuit board. When the printed circuit board is provided with 3D Hall sensors, the desired position can only be achieved in an approximate manner so that deviations occur between the actual position of the 3D Hall sensor on the printed circuit board and its desired position. If the plurality of Hall sensors are distributed over a plurality of printed circuit boards, there may be produced, owing to imprecise positioning of two adjacent printed circuit boards relative to each other, a displacement of the Hall sensors located on a printed circuit board relative to the Hall sensors which are located on the adjacent printed circuit board, which is also equivalent to a deviation from the desired position.

If no deviation exists between the desired position and the actual position of the Hall sensor, the offset of an output signal can be established according to the above-described method. However, if the actual position or orientation of a 3D Hall sensor deviates from a desired position thereof, that results in a change of the overlap ranges of the displacement measurement range thereof. The establishment of an offset according to the above-described method must take into consideration this change. That is very complex because it is different for each individual system produced, and particularly when the actual position of a plurality of Hall sensors deviates from the desired position thereof.

For that reason, there is a need for a method which automatically determines the offset at one of the two limits (transitions) $x_{tz0}$ and $x_{tz1}$. According to that method (also referred to below as a learning routine), the magnet is guided from a non-overlapping portion of a displacement measurement range via one of the two transitions $x_{tz0}$ and $x_{tz1}$ the output signal values output $Pos_{IC1}$ and $Pos_{IC2}$ are detected at the transition which the magnet was guided past and the difference between those two output signal values is formed.

In this method, a distinction also has to be made during the offset formation as to whether one of the overlapping displacement measurement ranges is a reference range or not.

For example, if the first of the displacement measurement ranges which overlap in FIG. 6 is a reference range, the offset for the output signal of the second displacement measurement range is equal to the difference between the output signals output at the transition $x_{tz0}$. Alternatively, the difference which was formed at $x_{tz1}$ can be used therefor.

If none of the displacement measurement ranges overlapping in FIG. 6 is a reference range, the offset is equal to the sum of the differences which were formed at all the transitions $x_{tz0}$ which are located between the reference range and the displacement measurement range, for the output signal of which the offset is intended to be established. Alternatively, the differences which were formed at $x_{tz1}$ can be used therefor.

The offset for the second displacement measurement range in FIG. 6 can also be established from the difference between the position signal value output at the transition $x_{tz0}$ and the output signal value which is output by the Hall sensor of the second displacement measurement range at the transition $x_{tz0}$. Alternatively, the corresponding difference which was formed for $x_{tz1}$ can be used therefor.

In relation to the displacement sensor arrangement illustrated in FIG. 3, it is then possible to calculate the offset of the output signal 207, $x_{Offset}$, as follows:

$$x_{offset} = Pos_{IC1} - Pos_{IC2}.$$

Occurrences of unsharpness arise in the event of rapid movements during the signal scanning. That is to say, the output signal values $Pos_{IC1}$ and $Pos_{IC2}$ are not detected precisely at the location $x_{tz0}$ and $x_{tz1}$, respectively, but instead shortly before or shortly after. Those occurrences of unsharpness increase with the increasing speed of the magnet. The precision of an offset which is established according to the learning routine is impaired by the occurrences of unsharpness during the signal scanning.

However, the learning routine may also be carried out during the production of each individual system only during use in the target application.

In order to increase the precision of an offset which is established on the basis of the learning routine, the learning routine is extended according to the invention in that the magnet is guided several times over one and the same transition $x_{tz0}$ (or $x_{tz1}$) and, every time the transition is passed, the output signal values $Pos_{IC1}$ and $Pos_{IC2}$ are detected and stored in a storage unit in a non-volatile manner. The number of those operations should be restricted because the output signal values for each operation must not be stored in a volatile manner.

The influence of the signal scanning on the precision of the offset establishment is substantially reduced by a mean value formation. Initially, the mean values of the output signal values $Pos_{IC1}$ and $Pos_{IC2}$ stored at a transition can be formed and, subsequently, the difference between the mean values established in that manner can be formed. Alternatively, however, the difference between the output signal values $Pos_{IC1}$ and $Pos_{IC2}$ which were detected for one and the same operation at a transition is first formed and subsequently the mean value of the differences is formed.

A plurality of methods can be used for the mean value formation, for example, median, arithmetic mean, geometric mean, quadratic mean, etcetera.

According to the invention, it is possible to further reduce the influence of the signal scanning on the precision of the offset establishment if a weighted mean value is used for the formation of the mean value of a plurality of output signal values and if the weighting of the output signal values is dependent on the speed of the magnet. In this case, the weighting must be stored in a state paired with the respective output signal value.

A further improvement in the precision of the offset formation is achieved if the output signal values which were detected at excessively high speeds of the magnet are not included in the formation of the mean value or the difference.

The mean value formation can be implemented in a technically simpler manner with fewer resources if the mean value is a sliding mean value.

The learning routine can also be applied if, during the first passage through one of the transitions $x_{tz0}$ and $x_{tz1}$, the magnet comes from an overlap range or a displacement measurement range which is not a reference range. When the transition is first passed, however, stored position values must be used. They can be established, for example, on the basis of the geometric arrangement of the 3D Hall sensors and the characteristic lines thereof. The learning method may only be used if the magnet has been in the non-overlapping portion of the reference range at least once. It is subsequently applied as described above.

The method for establishing the offset on the basis of the geometric arrangement of the 3D Hall sensors and the method for establishing the offset by means of the learning method can be combined with each other.

The principles of the present invention are not limited to a displacement sensor arrangement having two 3D Hall sensors but can also be transferred to displacement sensor arrangements having more than two 3D Hall sensors. The displacement measurement range of any 3D Hall sensor may act as the reference range.

The position information can be output by the 3D Hall sensors in the form of a pulse-width-modulated signal or an analogue voltage or an analogue current, or via a digital protocol (Sent, I$^2$C, LIN, etcetera). If the 3D Hall sensors do not directly output the position but instead angular information which is converted into a position, that calculation must be carried out before the further processing of the data in accordance with the above-described methods. (Methods for carrying this out are known.)

The position information is input according to the invention by means of a microcomputer, microcontroller, digital signal processor, etcetera, and is processed according to the methods described. Those processing units can also be integrated in a 3D Hall sensor. The processing unit outputs the position value in the form of a pulse-width-modulated signal or an analogue voltage or an analogue current, or via a digital protocol (Sent, I$^2$C, LIN, etcetera) to superordinate systems.

The present invention is not limited to the use of 3D Hall sensors. It can also be used in linear Hall technologies. Furthermore, it is possible to extend the present invention to magnetic field sensors which are suitable for contactless displacement detection by means of ICs, for example, sensors which are based on giant magnetoresistance (GMR sensors) or on the anisotropic magnetoresistive effect (AMR sensors).

The displacement sensor of the present invention can be used in contactless displacement measurements. It has the advantage that it has a far greater displacement detection range than a 3D Hall sensor currently on the market. A 3D Hall sensor currently on the market has a displacement detection range of approximately 4 cm. In comparison, a displacement sensor of the present invention has a displacement detection range of 7.8 cm if it comprises two 3D Hall sensors. In the case of a displacement sensor having 3D Hall sensors, the displacement detection range is even increased to 11.6 cm.

LIST OF REFERENCE NUMERALS

| | |
|---|---|
| 100 | 3D Hall sensor |
| 101 | Movement axis of the magnet along a 3D Hall sensor |
| 102 | Output signal of a 3D Hall sensor |
| 103 | First end of the displacement measurement range of a 3D Hall sensor |
| 104 | Second end of the displacement measurement range of a 3D Hall sensor |
| 200 | Printed circuit board of the displacement sensor |
| 201 | First 3D Hall sensor of the displacement sensor |
| 202 | Second 3D Hall sensor of the displacement sensor |
| 203 | Magnet |
| 204 | Movement axis of the magnet along the displacement sensor |
| 205 | Reference point |
| 206 | Output signal of the first 3D Hall sensor |
| 207 | Output signal of the second 3D Hall sensor |
| 208 | Overlap range |
| 209 | Overlapping end range of the first 3D Hall sensor |
| 210 | Overlapping end range of the second 3D Hall sensor |
| 211 | Zero point of the first 3D Hall sensor |
| 212 | Zero point of the second 3D Hall sensor |
| 401 | Relative error of the output signal of the first 3D Hall sensor |
| 402 | Relative error of the output signal of the second 3D Hall sensor |
| 403 | Relative total error of the position signal in a displacement sensor according to the invention |
| 404 | Maximal tolerable error |
| 503 | Relative total error of the position signal in a displacement sensor not in accordance with the invention |

Text in Figures:

| | |
|---|---|
| Ausgangssignal | Output signal |
| Weg | Path |
| Fehler | Error |
| Überlappungsbereich | Overlap range |
| Wegmessbereich | Displacement measurement range |

The invention claimed is:

1. A Displacement sensor for contactlessly measuring a position of a magnet relative to a reference point, which comprises:
the magnet which can be displaced along a movement axis,
a plurality of magnetic field sensors which are arranged in series and which are arranged parallel with the movement axis, and
a calculation unit for forming a position signal which indicates the position of the magnet relative to the reference point,
with each magnetic field sensor having a zero point and a displacement measurement range and being constructed in such a manner that it outputs an output signal which indicates a position of the magnet relative to the zero point of the magnetic field sensor and the precision with which the output signal indicates the position of the magnet decreases with increasing distance of the magnet from the zero point,
the plurality of magnetic field sensors arranged in series being arranged in such a manner that the displacement measurement ranges of adjacent magnetic field sensors overlap in an overlap range,
the calculation unit being constructed in such a manner that, if the position of the magnet is contained in an overlap range, it forms the position signal on the basis of output signals which are output by the magnetic field sensors whose displacement measurement ranges overlap in the overlap range, and,
if the position of the magnet is not contained in an overlap range, it forms the position signal on the basis of the output signal which is output by the magnetic field sensor, in the displacement measurement range of which the magnet is located and
the overlap range between two displacement measurement ranges of adjacent magnetic field sensors is selected in such a manner that the total error of the position signal formed by the calculation unit in that overlap range is smaller than a maximum tolerable error.

2. The displacement sensor according to claim 1, wherein if the position of the magnet is contained in the non-overlapping portion of a displacement measurement range, a linear relationship exists between the output signal of the magnetic field sensor which corresponds to that displacement measurement range and the position of the magnet relative to the zero point of that magnetic field sensor.

3. The displacement sensor according to claim 2, wherein if the position of the magnet is contained in the overlapping portion of a displacement measurement range, the repetition precision and therefore the linear relationship between the output signal of the magnetic field sensor which corresponds to that displacement measurement range and the position of the magnet relative to the zero point of that magnetic field sensor decrease.

4. The displacement sensor according to claim 1, wherein a calculation unit which is further constructed in such a manner that it forms, at the transition of the magnet from the non-overlapping portion of a first displacement measurement range to the overlap range of the first displacement measurement range having a second displacement measurement range, the difference between a first output signal value and a second output signal value,
the first output signal value and the second output signal value at the transition of the magnet out of the non-overlapping portion of the first displacement measurement range to the overlap range of the first displacement measurement range having the second displacement measurement range being output by a first or second magnetic field sensor, and the first magnetic field sensor corresponding to the first displacement measurement range and the second magnetic field sensor corresponding to the second displacement measurement range.

5. The displacement sensor according to claim 1, wherein the overlap range, at the transition of which the difference between a first output signal value and a second output signal value is formed, is the overlap range of the first displacement measurement range further away from the reference point.

6. Displacement sensor according to claim 1, wherein a calculation unit which is further constructed in such a manner that,
if the position of the magnet is contained in an overlap range between a first displacement measurement range and a second displacement measurement range and the first displacement measurement range contains the reference point, it forms the position signal on the basis of a first output signal and a second output signal corrected with an offset, if the position of the magnet is contained in an overlap range between a first displacement measurement range and a second displacement measurement range and the first displacement measurement range and the second displacement measurement range do not contain the reference point, it forms the position signal on the basis of a first output signal corrected with a first offset and a second output signal corrected with a second offset, the first output signal being output by a first magnetic field sensor which corresponds to the first displacement measurement range, the second output signal being output by a second magnetic field sensor which corresponds to the second displacement measurement range, and the second displacement measurement range being further away from the reference point than the first displacement measurement range, if the position of the magnet is contained in the non-overlapping portion of the displacement measurement range which contains the reference point, it forms the position signal on the basis of an output signal, and, if the position of the magnet is contained in the non-overlapping portion of a displacement measurement range and is not contained in the displacement measurement range which contains the reference range and therefore the reference point, it forms the position signal on the basis of an output signal corrected with an offset, the output signal being output by the magnetic field sensor in whose displacement measurement range the magnet is located.

7. The displacement sensor according to claim 6, wherein the offset for forming the position signal in the case in which the position of the magnet is contained in an overlap range between a first displacement measurement range and a second displacement measurement range and the first displacement measurement range contains the reference point, is equal to the difference between a first output signal value and a second output signal value, the difference having been formed at the transition from the non-overlapping portion of the first displacement measurement range to the overlap range in which the position of the magnet is located, the first offset and the second offset for forming the position signal in the case in which the position of the magnet is contained in an overlap range between a first displacement measurement range and a second displacement measurement range and the first displacement measurement range and the second displacement measurement range do not contain the reference point, being equal to the offset for forming the position signal in the non-overlapping portion of the first displacement measurement range or being equal to the sum of the differences between a first output signal value and a second output signal value, the differences having been formed at all the transitions which are located between the displacement measurement range containing the reference point and the displacement measurement range for which the offset is intended to be determined, and the offset for forming the position signal in the case in which the position of the magnet is contained in the non-overlapping portion of a displacement measurement range and is not contained in the displacement measurement range which contains the reference point, being equal to the second offset for forming the position signal in the overlap range of the displacement measurement range nearer the reference point.

8. The displacement sensor according to claim 7, wherein at least one of the two output signal values from which the difference is formed is a mean value of a plurality of output signal values which are output when the magnet passes one and the same transition several times and are stored in a non-volatile store.

9. The displacement sensor according to claim 8, wherein the first mean value is a weighted mean value, in which the weighting of an output signal value/position signal value is dependent on the speed of the magnet at the time of its production, and the second mean value is a weighted mean value in which the weighting of an output signal value is dependent on the speed of the magnet at the time of its production.

10. The displacement sensor according to claim 9, wherein the weighting decreases with increasing speed of the magnet and output signal values/position signal values which were generated at a speed of the magnet exceeding a specific maximum value are not used to form the first or second mean value.

11. The displacement sensor according to claim 6, wherein the offset for forming the position signal in the case in which the position of the magnet is contained in an overlap range between a first displacement measurement range and a second displacement measurement range and the first displacement measurement range contains the reference point, is equal to the difference between a first output signal value and a second output signal value, the difference having been formed at the transition from the non-overlapping portion of the first displacement measurement range to the overlap range in which the position of the magnet is located, the first offset and the second offset for forming the position signal in the case in which the position of the magnet is contained in an overlap range between a first displacement measurement range and a second displacement measurement range and the first displacement measurement range and the second displacement measurement range do not contain the reference point, being equal to the offset for forming the position signal in the non-overlapping portion of the first displacement measurement range, or being equal to the difference between a position signal value and an output signal value, the position signal value and the output signal value being output by the displacement sensor or the magnetic field sensor which corresponds to the second displacement measurement range at the transition of the magnet from the non-overlapping portion of the first displacement measurement range to the overlap range between the first displacement measurement range and the second displacement measurement range, and the offset for forming the position signal in the case in which the position of the magnet is contained in the non-overlapping portion of a displacement measurement range and is not contained in the displacement measurement range which contains the reference point being equal to the second offset for forming the position signal in the overlap range of the displacement measurement range nearer the reference point.

12. The displacement sensor according to claim 11, wherein the position signal value, on the basis of which the difference is formed, is a mean value of one or more position signal value pairs which are output when the magnet passes one and the same transition several times and which are stored in a non-volatile store or the output signal value, on the basis of which the difference is formed, is a mean value of one or more output signal value pairs which are output when the magnet passes one and the same transition several times and which are stored in a non-volatile store.

13. The displacement sensor according to claim 8 or claim 12, wherein the mean value is a sliding mean value.

14. The displacement sensor according to claim 6, wherein the plurality of magnetic field sensors are mounted on a printed circuit board, the offset with which an output signal is corrected is determined on the basis of the knowledge of the desired positions of the magnetic field sensors on the printed circuit board, and the offset is stored in a non-volatile storage unit.

15. The displacement sensor according to claim 6, wherein a calculation unit which is further constructed in such a manner that, if the position of the magnet in the overlap range is contained between a first displacement measurement range and a second displacement measurement range, it selects the output signal having the greatest precision between the first output signal and the second output signal, and it uses the selected output signal to form the position signal.

16. The displacement sensor according to claim 6, wherein a calculation unit which is further constructed in such a manner that, if the position of the magnet is contained in the overlap range between a first displacement measurement range and a second displacement measurement range and the first displacement measurement range contains the reference point, it forms a weighted mean value from the first output signal and the second output signal corrected with an offset, and, if the position of the magnet is contained in the overlap range between a first displacement measurement range and a second displacement measurement range and the first and second displacement measurement ranges do not contain the reference point, it forms a weighted mean value from the first output signal corrected with a first offset and the second output signal corrected with a second offset, the weighting of the signals from which the weighted mean value is formed being dependent on the position of the magnet in the overlap range, and using the weighted mean value to form the position signal.

17. The displacement sensor according to claim 6, wherein a calculation unit which is further constructed in such a manner that it forms in the overlap range a position signal which has the path of an S-line or a parabola or an exponential function or any line shape with a monotonous gradient.

18. The displacement sensor according to claim 1, wherein one magnetic field sensor from the plurality of magnetic field sensors is a 3D Hall sensor or a linear Hall sensor.

* * * * *